United States Patent [19]
Hayashi et al.

[11] 3,787,002
[45] Jan. 22, 1974

[54] EMERGENCY LOCKING DEVICE FOR SAFETY SEAT BELT USED IN MOTOR VEHICLES AND THE LIKE

[75] Inventors: Yoshihiro Hayashi, Toyota; Masahiro Iwatsuki, Anjo, both of Japan

[73] Assignee: Kabushiki-Kaisha Tokai Rika Denki Seisakusho, Aichi-ken, Japan

[22] Filed: Oct. 12, 1971

[21] Appl. No.: 188,141

[30] Foreign Application Priority Data
Oct. 20, 1970   Japan.............................. 45-104208
Oct. 20, 1970   Japan.............................. 45-104210

[52] U.S. Cl.... 242/107.4, 188/82.77, 200/61.58 SB
[51] Int. Cl....................... A62b 35/02, B65h 63/04
[58] Field of Search...... 242/107.4, 107.3, 107 SB, 242/107 K; 280/150 SB; 297/386, 387, 388; 188/82.77; 310/105

[56] References Cited
UNITED STATES PATENTS
| | | | |
|---|---|---|---|
| 3,698,657 | 10/1972 | Kirchhoff | 242/107.4 |
| 2,708,555 | 5/1955 | Heinemann et al. | 242/107.4 |
| 3,214,218 | 10/1965 | Gill | 242/107.4 |
| 3,416,747 | 12/1968 | Stoffel | 242/107.4 |
| 2,953,315 | 9/1960 | Lautier et al. | 242/107.4 |
| 3,064,920 | 11/1962 | Cushman et al. | 242/107.4 |
| 3,421,605 | 1/1969 | Hansen | 242/107.4 |
| 912,504 | 2/1909 | Steckel et al. | 310/105 |

*Primary Examiner*—John W. Huckert
*Assistant Examiner*—Jon W. Henry
*Attorney, Agent, or Firm*—Shlesinger, Fitzsimmons & Shlesinger

[57] ABSTRACT

An improvement in an emergency locking device for a safety seat belt in which a webbing roller is locked against rotation in the uncoiling direction as it is about to rotate at a speed higher than a certain predetermined value as a result of a sudden uncoiling or protracting movement of said safety belt.

3 Claims, 6 Drawing Figures

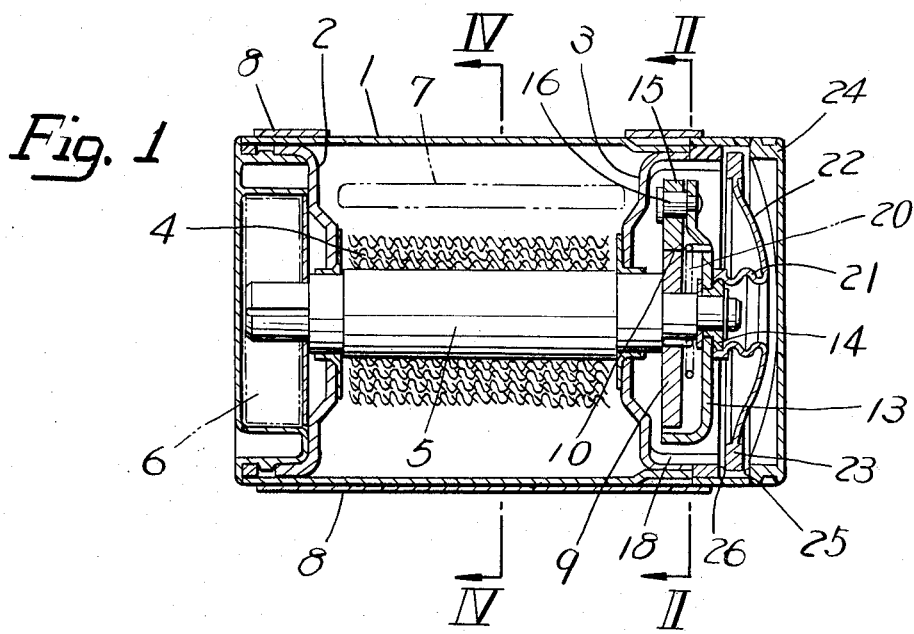
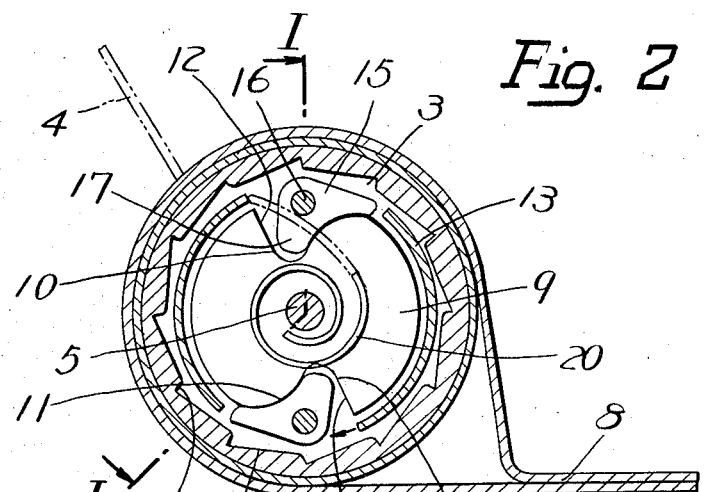
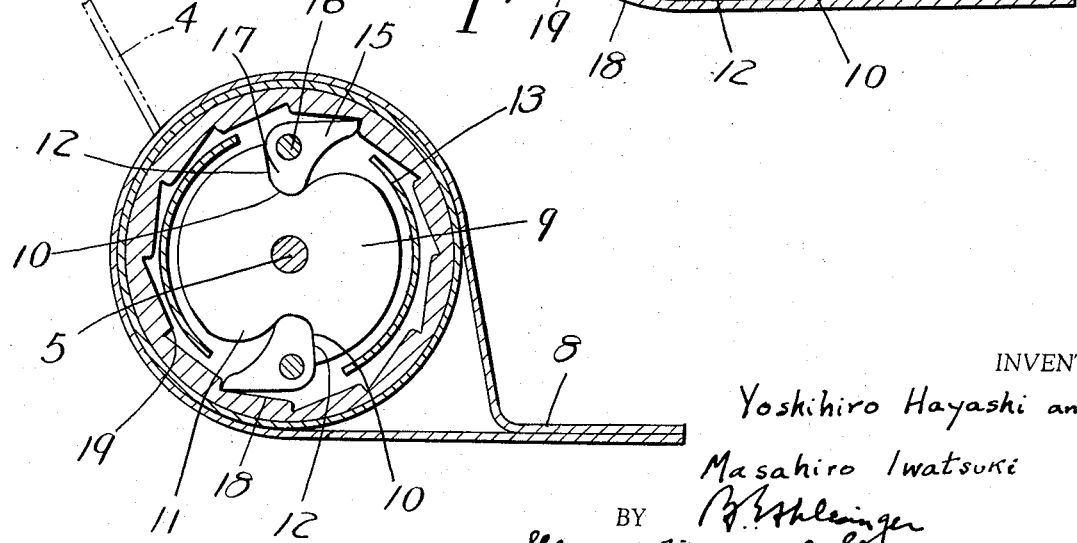

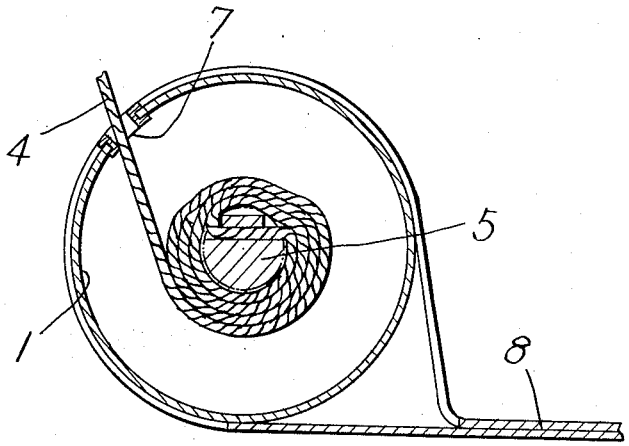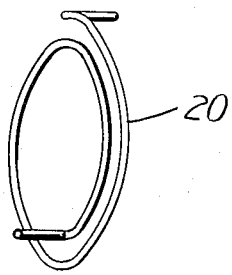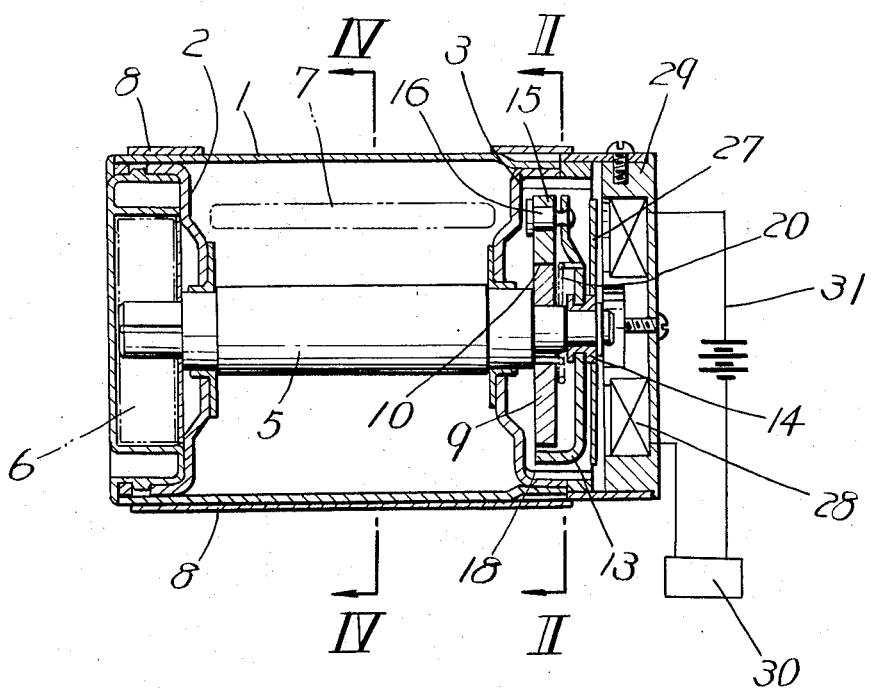

EMERGENCY LOCKING DEVICE FOR SAFETY SEAT BELT USED IN MOTOR VEHICLES AND THE LIKE

This invention relates to an improvement in an emergency locking device for a safety seat belt whereby a webbing roller is locked against rotation in the uncoiling direction as it is about to rotate at a speed higher than a certain predetermined value as a result of a sudden uncoiling or protracting movement of said safety seat belt.

In the accompanying drawing illustrative of two preferred embodiments of the invention;

FIG. 1 is a partly cut front sectional view taken on the line I—I in FIG. 2,

FIGS. 2 and 3 are sectional side elevational views taken on the line II—II of FIG. 1, and illustrating the present device in the unlocking and the emergency locking conditions, respectively, FIG. 4 is a sectional side elevation taken on the line IV—IV of FIGS. 1 and 6, FIG. 5 is a perspective view of a spring constituting a spring connection means as used in the present invention, and FIG. 6 is a view similar to FIG. 1 and showing an alternative embodiment of the invention in a partly cut front view.

The first embodiment of the invention will now be explained by referring especially to FIGS. 1 to 5 of the accompanying drawing.

The numeral 1 denotes a cylindrical housing of the webbing roller, to the ends of which are fixedly fitted saucer-shaped side walls 2, 3. A webbing roller 5 is passed rotatably through the center of housing 1 and secured at one end to a safety seat belt 4. A coil spring 6 is mounted to the outer side of the side wall 2 so as to urge the seat belt 4 to rotate in the retracting direction. Safety seat belt 4 is pulled out from an exit opening 7 on the housing 1. This housing 1 houses the present device in its entirety and constitutes a mounting means for securing the device to the floor of a motor vehicle. The numeral 9 denotes a control plate for pawl members 15 fixedly fitted to the webbing roller 5 at the outer side of the side wall 3. Said control plate has a pair of recesses 10 on its circumference. The numeral 13 denotes a rotatable operating member loosely fitted on webbing roller 5 at the outer side of said control plate 9 by means of a boss 14 so as to be freely rotatable about webbing roller 5. Said operating member 13 mounts pivotally said L-shaped pawl members 15 by means of mounting shafts 16. Each of said recesses 10 on said control plate 9 comprises two continuous edge parts 11 and 12 adapted respectively to cooperate with two opposite sides of an arm portion 17 of a pawl member 15. Numeral 18 denotes a number of teeth arranged in a circle on the inner peripheral part of said side wall 3. The tooth flank of each of said teeth 18 is adapted for engagement with the foremost part of each pawl member 15. Numeral 20 denotes a spring secured at its two ends to opposing surfaces of said control plate 9 and operating member 13 and adapted for coupling them together in either direction of rotation. Said spring 20 constitutes an elastic or spring coupling means for causing said operating member 13 to rotate at the same speed of rotation as said webbing roller 5 and in synchronism therewith under normal operating conditions of the present emergency locking device. It will be readily understood that the operating member 13 is resiliently urged to move in the direction of working force of the spring 20 and each pawl member 15 normally is kept in close contact with one of the edges 11 of one recess 10 on the control plate 9 as will be seen from FIG. 2. Pawl member 15 is thus normally out of engagement with teeth 18 formed on the inner periphery of the side wall 3.

Numeral 21 denotes an elastic body made from rubber in the form of a bellows and fixedly fitted at its inner end to said boss 14 of said operating member 13. Said elastic body 21 is also formed at its outermost part with a radial extension constituting a brake disc 22, the peripheral part of which is formed into a friction ring part 23 of considerable thickness. Numeral 24 denotes a cover fitted to the side wall 3 and formed with friction braking surfaces 25, 26 adapted to receive said ring part 23 and 10 also facing to said ring part 23.

The operation of the first embodiment of the invention is as follows:

Operating member 13 is fitted around webbing roller 5 for free rotation thereabout and coupled thereto through said control plate 9 under the action of spring 20 constituting an elastic or spring coupling means. When safety seat belt 4 is protracted at a lower speed, said operating member 13 will rotate at the same speed of rotation as said webbing roller 5 and with one of the edges 11 of each recess 10 on the control plate 9 in engagement with pawl 15, as will be seen from FIG. 2. Said pawl member 9 will thus be kept in rotation without any mechanical engagement between its pawls and teeth 18 formed on the side wall 3.

When the passenger in a vehicle wears safety seat belt 4 in the protracted condition and the vehicle is subjected to sudden acceleration as a result of sudden brake application or collision, safety belt 4 will be protracted rapidly by the inertia motion of the passenger's body. Webbing roller 5 will thus rotate in the direction of protraction at a rotational speed higher than its normal value. Said elastic body 21 will be subjected to flexure instantaneously owing to a sudden shock applied to the vehicle, and the brake disc 22 will be tilted. Thus, the friction ring 23 will be brought into contact with friction brake surfaces 25 or 26 or both, thus braking the operating member 13 against further rotation. There is thus induced a differential motion between said member 13 and the control plate 9, which is always kept in synchronous rotation with webbing roller 5. The control plate 9 will rotate faster than said member 13 and each pawl member 15 pivotally mounted to said operating member will abut with one of its edges against the edge 12 of the associated recess 10 on the control plate 9. The foremost part of said pawl member 15 will thus be projected radially and brought in mesh with one of the teeth 18 formed on the side wall 3, as illustrated in FIG. 3. Thus, the webbing roller 5 is immediately locked against rotation in the direction of protraction of seat belt 4 through the medium of the control plate 9.

As will become obvious from the foregoing description of the first embodiment, when a rotatable operating member fitted on the webbing roller for free rotation thereabout and coupled operationally so as to make synchronous rotation therewith is subjected to a sudden effort as a result of deceleration or acceleration induced by sudden braking or collision or hitting of the vehicle from behind by another vehicle, the safety seat belt 4 will be suddenly and rapidly protracted, at the same time that a brake disc coupled to said operating member will be tilted or displaced axially, thus inducing a braking operation. This braking effort will then be transmitted to said operating member and there is thus caused a differential motion between the latter and the control plate fixedly fitted to the webbing roller. The pawl member 15 pivotally mounted on the operating member 13 will be radially projected outwards at its foremost part and come in meshing with one of the teeth formed on the side wall member, thus locking said webbing roller immediately against rotation in the case of an emergency. The present embodiment is positive in its locking operation without the necessity of provision of any special acceleration sensing device, while it is simple in construction and easy to operate.

Next, the second embodiment of the invention will be explained by referring to FIG. 6. In this FIG. 6, parts and members denoted by the reference numerals 1 to 26 are the same in construction as those already explained by refernce to FIGS. 1 to 5.

Numeral 27 in FIG. 6 denotes a brake disc jointed and se-cured to the outer surface of the rotatable operating member 13. Numeral 28 denotes an electromagnetic coil placed in opposition to said brake disc 27 and a coil casing 29 is fixedly fitted in the side wall 3. Numeral 30 denotes an acceleration switch of the known construction adapted to be turned on when it has sensed acceleration or deceleration which is higher than a predetermined value. This switch 30 is placed in an electric circuit adapted for energizing an electromagnetic coil 28. This electromagnetic coil 28 constitutes an example of the electromagnetic braking device to be utilized in the present second embodiment. This braking device can be so designed that the brake disc 27 is pressed for performing a braking operation upon energization of such braking device.

The operation of this second embodiment is as follows:

As already described, the operating member 13 is fitted around webbing roller 5 for free rotation thereabout and coupled therewith through control plate 9 under the action of a spring 20 constituting an elastic or spring coupling means. When safety seat belt 4 is protracted at a slow speed, such operating member 13 will rotate at the same speed of rotation as said webbing roller 5 and with one of the edges of the arm part 17 of each pawl member 15 in close contact with the edge 11 of the associated recess 10 on the control plate 9, as will be supposed from FIG. 2. Each pawl member 15 will thus be kept in rotation without any mechanical collision between its foremost part and said teeth 18 formed on the side wall 3.

When the passenger in a vehicle wears safety seat belt 4 in a protracted condition, and a sudden deceleration is caused to the vehicle as a result of a sudden braking or collision, seat belt 4 will be protracted at an enhanced speed by the inertia motion of the passenger's body. Simultaneously, acceleration switch 30 will come in operation and energize electromagnetic coil 28. Magnetic lines of force will thus be produced and attract brake disc 27 for performing a braking operation. The braking effort thus produced will be transmitted to the rotatable member 13. There is thus induced a differential motion between said rotatable member 13 and the control plate 9 which is kept in synchronous rotation with said webbing roller 5. The control plate 9 will rotate faster than said rotatable member 13, and each pawl member 15 pivotally mounted on said member 13 will thus abut with one of its edges against the edge 12 of the recess 10 on the control plate 9. The foremost part of each pawl member 15 will thus be projected radially and brought into mesh with one of the teeth 18 formed on the side wall 3, as illustrated in FIG. 3.

According to this second embodiment, a rotatable operating member is fitted freely on a webbing roller and adapted normally for rotation at the same rotational speed as said webbing roller by the elastic or spring coupling device. There is mounted a brake plate to this operating member capable of performing a braking action through energization of the braking electromagnetic device. When sudden deceleration or acceleration is applied to the vehicle, acceleration switch will come in operation instantaneously and energize said electromagnetic device so as to exert a braking effort to said operating member. Thus, as a result of such acceleration, safety seat belt is protracted and there is caused a differential motion between said operating member and said webbing roller. Thus, a differential motion caused by the instantaneous operation of the braking electromagnetic device is utilized for locking positively said webbing roller against rotation in the direction of protracting safety belt 4. Thus, by using an acceleration switch of reliable operation, locking operation can be obtained rapidly and accurately for protection of the passenger against serious risk owing to an inertia motion caused by the sudden vehicle acceleration or deceleration.

What is claimed is:

1. An emergency locking device for a safety seat belt comprising
   a rotary webbing roller,
   an operating member rotatable on said webbing roller,
   elastic coupling means normally coupling said operating member to said webbing roller so that said operating member normally performs a synchronized rotation with said webbing roller,
   a braking plate connected to said operating member,
   a stationary surface adjacent said plate,
   a centrally arranged flexible elastic body between said plate and said operating member and which flexes upon rotation of said roller in excess of a predetermined value to urge said brake plate against said stationary surface thereby effecting relative rotation between said operating member and said roller,
   a pawl member pivotally mounted to said operating member,
   a stationary member surrounding said operating member and coaxial with said webbing roller and having a number of internal teeth arranged in a circle around said operating member in opposition to said pawl member and normally disengaged therefrom,
   a control plate fixedly fitted to said webbing roller, and
   means on said control plate for engaging said pawl member upon rotation of said control plate relative to said operating member to pivot said pawl member on said operating member to project said pawl member into engagement with a tooth of said stationary member to effect a braking action on said roller.

2. An emergency locking device for a safety seat belt comprising,
   a webbing roller,
   an operating member rotatable on said webbing roller,
   elastic coupling means normally coupling said webbing roller to said operating member so that said operating member normally performs a synchronized rotation with said webbing roller,
   a brake plate secured to said operating member,
   a braking electromagnetic device mounted in opposition to said brake plate and operative when energized to brake said operating member,
   a pawl member pivotally mounted on said operating member,
   a stationary member having a number of teeth thereon arranged in angularly spaced relation in a circle around said operating member and in opposition to, and normally disengaged from, said pawl member,
   a control plate fixedly fitted to said webbing roller,
   means on said control plate for pivoting said pawl member into locking engagement with one of said teeth when a differential motion between said control plate and said operating member is caused by the braking of said operating member, and
   an electric circuit including an acceleration switch connected in circuit with said electromagnetic device and operative upon acceleration of said control plate higher than a predetermined value to energize said braking electromagnetic device to cause said pawl member to move into locking engagement with one of said teeth.

3. An emergency locking device for a safety seat belt, comprising
   a rotary webbing roller,
   a rotatable operating member loosely fitted on said webbing roller,
   a control plate fixed to said webbing roller,
   a pawl pivotally mounted on said operating member and engaged with said control plate for pivotal movement thereby upon relative rotation between said control plate and said operating member,
   resilient means coupling said operating member with said webbing roller,
   a brake plate secured to said operating member,
   a fixed member surrounding said operating member and coaxial with said webbing roller and having a plurality of internal teeth arranged around said operating member for engagement by said pawl, and
   means for applying a braking force to said brake plate when said webbing roller is rotated at an acceleration in excess of a predetermined value to produce relative rotational motion between said control plate and said operating member to cause said pawl to pivot on said operating member into engagement with a tooth of said fixed member to lock said webbing roller against rotation,
   said pawl being pivoted intermediate its ends on said operating member,
   said control plate having a peripheral notch in it wherein one end of said pawl engages, said end normally engaging against one side of said notch, and
   said notch having an angular width greater than the angular width of said one end so that when said relative rotational motion occurs the other side of said notch engages said pawl to pivot said pawl so that its other end engages a tooth of said fixed member.

* * * * *